(12) United States Patent
Koreeda

(10) Patent No.: US 6,712,521 B1
(45) Date of Patent: Mar. 30, 2004

(54) OPTICAL CONNECTOR ENABLING MULTICORE STRUCTURE BY EFFICIENTLY UTILIZING SPACE

(75) Inventor: Yuichi Koreeda, Hachiouji (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 0 days.

(21) Appl. No.: 10/325,128

(22) Filed: Dec. 20, 2002

(51) Int. Cl.[7] ................................................ G02B 6/38
(52) U.S. Cl. ............................. 385/56; 385/60; 385/62; 385/63
(58) Field of Search ............................. 385/56, 60, 62, 385/63

(56) References Cited

U.S. PATENT DOCUMENTS

| | | | | |
|---|---|---|---|---|
| 4,690,494 A | * | 9/1987 | Hirose et al. ................... | 385/60 |
| 4,762,389 A | * | 8/1988 | Kaihara ......................... | 385/60 |
| 5,689,598 A | * | 11/1997 | Dean et al. ..................... | 385/59 |
| 6,095,695 A | * | 8/2000 | Ohtsuka et al. ................ | 385/72 |
| 6,505,976 B1 | * | 1/2003 | Grois et al. .................... | 385/78 |
| 6,513,989 B1 | * | 2/2003 | Bleck et al. .................... | 385/60 |

FOREIGN PATENT DOCUMENTS

JP     9043453    2/1997

* cited by examiner

*Primary Examiner*—Ellen E. Kim
(74) *Attorney, Agent, or Firm*—Collard & Roe, P.C

(57) ABSTRACT

In an optical connector for connecting an optical fiber to a connection counterpart in a first direction, a housing for retaining the optical fiber has a pair of main side surfaces confronting each other in a second direction perpendicular to the first direction, and a pair of auxiliary side surfaces confronting each other in a third direction perpendicular to the first and the second directions. The housing and an engaging member slidable relative to the housing are biased by a biasing member mutually opposite in the first direction. The engaging member has a pair of engaging strips each extending along the corresponding main side surface of the housing in the first direction and engaging with the corresponding main side surface of the housing in a direction against the biasing member. The engaging member further has a spring strip extending along one of the auxiliary side surfaces in the first direction while being spaced apart therefrom, and being elastically deformable in the third direction. The spring strip is provided with an outer retaining member for retaining another member in the first direction.

15 Claims, 4 Drawing Sheets

OPTICAL CONNECTOR ENABLING MULTICORE STRUCTURE BY EFFICIENTLY UTILIZING SPACE

BACKGROUND OF THE INVENTION

The present invention relates to an optical connector for connecting an optical fiber to a connection counterpart.

One example of an optical connector of this type is disclosed in JP-A-H9-43453. The optical connector comprises a housing retaining an optical fiber, and a U-shaped retaining member receiving the housing therein. The housing is biased by a spring relative to the retaining member in a connecting direction of the optical fiber. The housing is prevented from being detached from the retaining member by a retaining mechanism.

Following the recent remarkable progress in optical transmission technology, there have been required small multicore optical connectors that enable connection of multiple optical fibers. For configuring the optical connector to have a multicore structure, it was conventionally necessary to provide as many optical connectors as the number of cores. This causes the optical connector to be large on the whole and complicates assembling thereof.

SUMMARY OF THE INVENTION

It is therefore an object of the present invention to provide an optical connector that enables a multicore structure thereof by utilizing a space efficiently.

It is another object of the present invention to provide an optical connector that is easy to assemble.

It is still another object of the present invention to provide an optical connector having a structure for preventing misfitting.

Other objects of the present invention will become clear as the description proceeds.

According to one aspect of the present invention, there is provided an optical connector for connecting an optical fiber to a connection counterpart in a first direction. The optical connector comprises a housing for holding the optical fiber, the housing having a pair of main side surfaces confronting each other in a second direction perpendicular to the first direction, and a pair of auxiliary side surfaces confronting each other in a third direction perpendicular to the first and the second direction, an engaging member slidable relative to the housing in the first direction, and a biasing member coupled to the housing and the engaging member for biasing the housing and the engaging member mutually opposite in the first direction. In the optical connector, the engaging member comprises a pair of engaging strips each extending along a corresponding one of the main side surfaces in the first direction and engaging with the corresponding one in a direction against the biasing member, a spring strip extending along one of the auxiliary side surfaces in the first direction while being spaced apart therefrom, and being elastically deformable in the third direction, and an outer retaining member joined with the spring strip for retaining another member in the first direction.

According to another aspect of the present invention, there is provided an optical connector for connecting an optical fiber to a connection counterpart in a first direction. The optical connector comprises a plurality of aligned optical connector elements and a first housing fitted over the optical connector elements collectively. In the optical connector, each of said optical connector elements comprises a second housing for retaining the optical fiber, the second housing having a pair of main side surfaces opposite to each other in a second direction perpendicular to the first direction, and a pair of auxiliary side surfaces opposite to each other in a third direction perpendicular to the first and the second directions, an engaging member slidable relative to the second housing in the first direction, and a biasing member coupled to the second housing and the engaging member for biasing the second housing and the engaging member mutually opposite in the first direction. The engaging member comprises a pair of engaging strips each extending along a corresponding one of the main side surfaces in the first direction and engaging with the corresponding one of the main side surfaces in a direction against the biasing member, a spring strip extending along one of the auxiliary side surfaces in the first direction while being spaced apart therefrom, and being elastically deformable in the third direction, and an outer retaining member joined with the spring strip for retaining another member in the first direction.

DESCRIPTION OF THE PREFERRED EMBODIMENT

Figure 1:
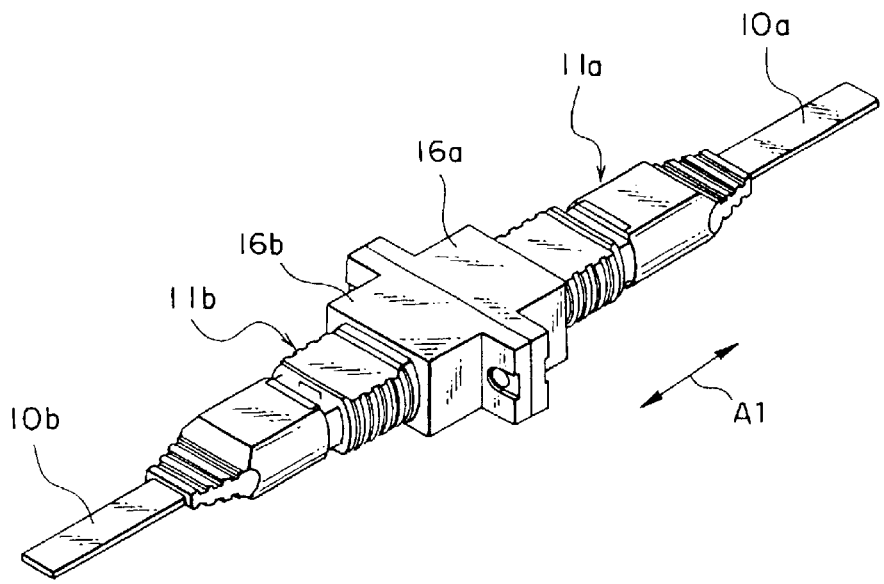
FIG. 1 is an external perspective view showing a connected state of an optical connector according to a preferred embodiment of the present invention.
Figure 2:
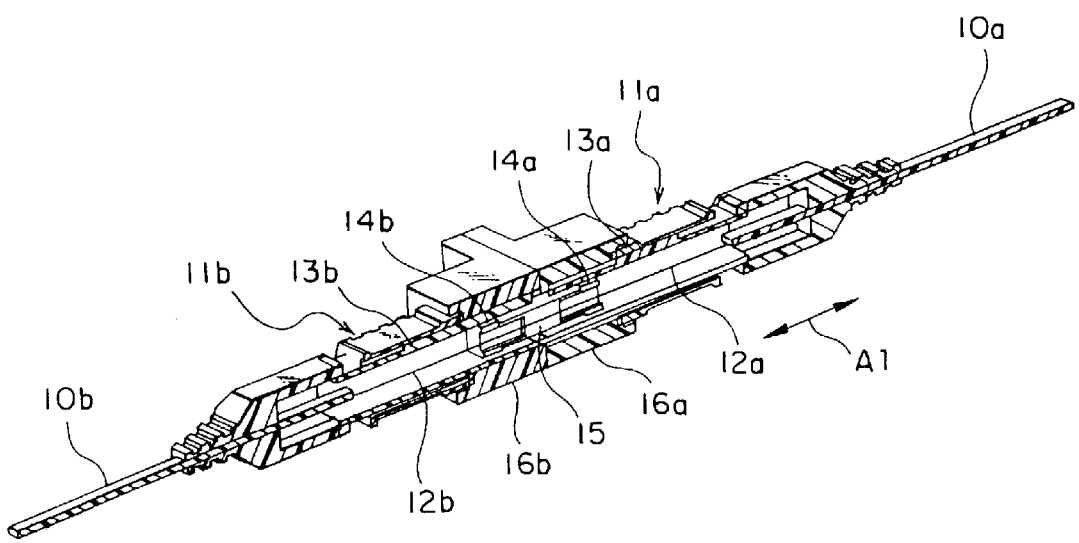
FIG. 2 is a half-sectioned perspective view of the optical connector shown in FIG. 1.

Referring to FIGS. 1 and 2, the entire structure of an optical connector according to a preferred embodiment of the present invention will be described.

The shown connector is for connecting first and second optical fibers 10a and 10b together in a first direction A1, and comprises a first optical connector 11a connected to the first optical fiber 10a and a second optical connector 11b connected to the second optical fiber 10b. Each of the optical fibers 10a and 10b is obtained by integrally forming a plurality of, e.g. four core lines 12a or 12b together into a tape-shape (in FIG. 2, only one core line is exemplarily shown for brevity).

The first optical connector 11a comprises a first resin housing 13a where the first optical fiber 10a is fixed, and an internal structure 14a fixed to the interior of the first housing 13a and retaining the core lines 12a. The second optical connector 11b comprises a second resin housing 13b where the second optical fiber 10b is fixed, and an internal structure 14b fixed to the interior of the second housing 13b and retaining the core lines 12b. The first and second internal structures 14a and 14b are fitted in a square tubular adapter 15 while contacting with each other therein. Therefore, the first and second optical fibers 10a and 10b also contact with each other at their end surfaces within the adapter 15, thereby to establish optical connection between the first and second optical fibers 10a and 10b.

Further, first and second jointing members 16a and 16b are fixed to the first and second housings 13a and 13b, respectively. The first and second jointing members 16a and 16b are jointed together by means of suitable coupling members (not shown). As a result, the optical connection between the first and second optical fibers 10a and 10b is maintained.

Figure 3:
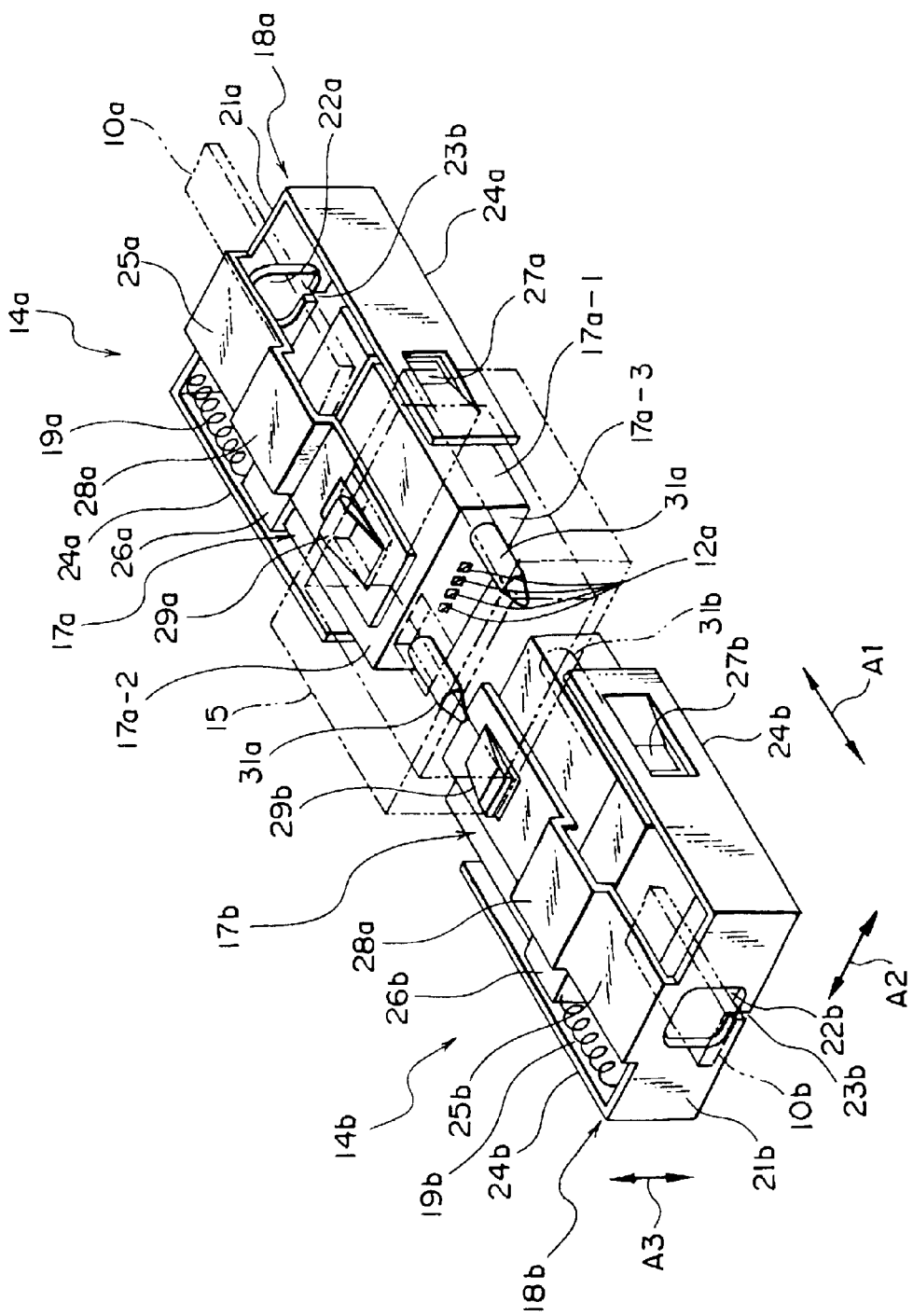
FIG. 3 is a perspective view showing the main part of the optical connector shown in FIG. 1.

Referring to FIG. 3, the first and second internal structures 14a and 14b will be described.

The first internal structure 14a comprises a first rectangular parallelepiped housing 17a made of an insulating material and retaining the first optical fiber 10a. The first housing 17a has a pair of main side surfaces 17a-1 confronting each other in a second direction A2 perpendicular to the first direction A1, a pair of auxiliary side surfaces 17a-2 confronting each other in a third direction A3 perpendicular to the first and the second direction A1 and A2, and a pair of axial end surfaces 17a-3 confronting each other in the first direction A1. The first optical fiber 10a is fixed to one of the axial end surfaces 17a-3 of the first housing 17a by means of adhesives or the like.

The first internal structure 14a further comprises a first engaging member 18a made of an elastic material and combined with the first housing 17a so as to be slidable relative thereto in the first direction A1, and a pair of first biasing members 19a each coupled to the first housing 17a and the first engaging member 18a for biasing or urging the first housing 17a and the first engaging member 18a mutually opposite in the first direction A1. Each of the first biasing members 19a may be called an urging member.

The first engaging member 18a has an end or base portion 21a confronting the one of the axial end surfaces 17a-3 of the first housing 17a. The base portion 21a is formed with a through hole 22a for insertion of the first optical fiber 10a therethrough, and with a cutout 23a extending from the through hole 22a to the outer edge of the base portion 21a for allowing the first optical fiber 10a to pass therethrough. Each of the first biasing members 19a is in the form of an elastic body such as a compression coil spring disposed between the one of the axial end surfaces 17a-3 of the first housing 17a and the base portion 21a so as to be retractable in the first direction A1.

The first engaging member 18a further comprises a pair of side portions or engaging strips 24a each extending from the base portion 21a in one of the first direction A1 along the corresponding main side surface 17a-1 of the first housing 17a, and a top portion or spring strip 25a extending from the base portion 21a in the one of the first direction A1 along one of the auxiliary side surfaces 17a-2 of the first housing 17a, i.e. along an upper surface of the first housing 17a, while being spaced apart therefrom. Each of the engaging strips 24a is elastically deformable in the second direction A2. The spring strip 25a is elastically deformable in the third direction A3.

At an intermediate position in the first direction A1, the first housing 17a has a pair of projecting portions 26a each projecting outward. Each engaging strip 24a of the first engaging member 18a has an inner retaining portion 27a retained by or engaged with the corresponding projecting portion 26a in a direction against the first biasing member 19a. Each inner retaining portion 27a is in the form of an elastic spring strip projecting obliquely from the engaging strip 24a to approach the first housing 17a in the second direction A2. Each inner retaining portion 27a is formed by cutting square the engaging strip 24a with one side remaining to define an approximately U-shaped cut-out portion and folding the U-shaped portion inward.

The spring strip 25a of the first engaging member 18a has a deformed portion 28a having an approximately U-shape in section to form a projection. The spring strip 25a is formed with an outer retaining portion 29a that is retained by or engaged with another member, i.e. the adapter 15, in the first direction A1. The outer retaining portion 29a is in the form of an elastic spring strip projecting obliquely from the spring strip 25a to extend away from the first housing 17a in the third direction A3. The outer retaining portion 29a is formed by cutting square the spring strip 25a with one side remaining to define an approximately U-shaped cut-out portion and folding the U-shaped portion outward.

The cutout 23a is formed on an opposite side with respect to the spring strip 25a, seeing from the through hole 22a. Therefore, the first engaging member 18a can be attached to or detached from the first housing 17a while the first optical fiber 10a is retained by the first housing 17a.

On the other of the axial end surfaces 17a-3 of the first housing 17a, i.e. on the surface confronting the second internal structure 14b, a pair of guide pins 31a are projected for guiding the second internal structure 14b to achieve alignment. The core lines 12a of the first optical fiber 10a pass through the first housing 17a so as to be led to the other of the axial end surfaces 17a-3, and axial end surfaces of the core lines 12a are exposed between the guide pins 31a.

On the other hand, the second internal structure 14b comprises a second rectangular parallelepiped housing 17b made of an insulating material and retaining the second optical fiber 10b. The second housing 17b has a pair of main side surfaces 17b-1 confronting each other in the second direction A2, a pair of auxiliary side surfaces 17b-2 confronting each other in the third direction A3, and a pair of axial end surfaces 17b-3 confronting each other in the first direction A1. The second optical fiber 10b is fixed to one of the axial end surfaces 17b-3 of the second housing 17b by means of adhesives or the like.

The second internal structure 14b further comprises a second engaging member 18b made of an elastic material and combined with the second housing 17b so as to be slidable relative thereto in the first direction A1, and a pair of second biasing members 19b each coupled to the second housing 17b and the second engaging member 18b for biasing or urging the second housing 17b and the second engaging member 18b mutually opposite in the first direction A1. Each of the second biasing members 19b may also be called an urging member.

The second engaging member 18b has an end or base portion 21b confronting the one of the axial end surfaces 17b-3 of the second housing 17b. The base portion 21b is formed with a through hole 22b for insertion of the second optical fiber 10b therethrough, and with a cutout 23b extending from the through hole 22b to the outer edge of the base portion 21b for allowing the second optical fiber 10b to pass therethrough. Each of the second biasing members 19b is in the form of an elastic body such as a compression coil spring disposed between the one of the axial end surfaces 17b-3 of the second housing 17b and the base portion 21b so as to be retractable in the first direction A1.

The second engaging member 18b further comprises a pair of side portion or engaging strips 24b each extending from the base portion 21b in the one of the first direction A1 along the corresponding main side surface 17b-1 of the second housing 17b, and an upper portion or spring strip 25b extending from the base portion 21b in the one of the first direction A1 along one of the auxiliary side surfaces 17b-2 of the second housing 17b, i.e. along an upper surface of the second housing 17b, while being spaced apart therefrom. Each of the engaging strips 24b is elastically deformable in the second direction A2. The spring strip 25b is elastically deformable in the third direction A3.

At an intermediate position in the first direction A1, the second housing 17b has a pair of projecting portions 26b each projecting outward. Each engaging strip 24b of the second engaging member 18b has an inner retaining portion 27b retained by or engaged with the corresponding projecting portion 26b in a direction against the second biasing member 19b. Each inner retaining portion 27b is in the form of an elastic spring strip projecting obliquely from the engaging strip 24b to approach the second housing 17b in the second direction A2. Each inner retaining portion 27b is formed by cutting square the engaging strip 24b with one side remaining to define an approximately U-shaped cut-out portion and folding the U-shaped portion inward.

The spring strip 25b of the second engaging member 18b has a deformed portion 28b having an approximately U-shape in section to form a projection. The spring strip 25b is formed with an outer retaining portion 29b that is retained by or engaged with another member, i.e. the adapter 15, in the first direction A1. The outer retaining portion 29b is in the form of an elastic spring strip projecting obliquely from the spring strip 25b to extend away from the second housing 17b in the third direction A3. The outer retaining portion 29b is formed by cutting square the spring strip 25b with one side remaining to define an approximately U-shaped cut-out portion and folding the U-shaped portion outward.

The cutout 23b is formed on an opposite side with respect to the spring strip 25b, seeing from the through hole 22b. Therefore, the second engaging member 18b can be attached to or detached from the second housing 17b while the second optical fiber 10b is retained by the second housing 17b.

On the other of the axial end surfaces 17b-3 of the second housing 17b, i.e. on the surface confronting the first internal structure 14a, a pair of guide holes 31b are formed for receiving therein the pair of guide pins 31a of the first internal structure 14a. The core lines 12b of the second optical fiber 10b pass through the second housing 17b so as to be led to the other of the axial end surfaces 17b-3, and axial end surfaces of the core lines 12b are exposed between the guide holes 31b.

Figure 4:
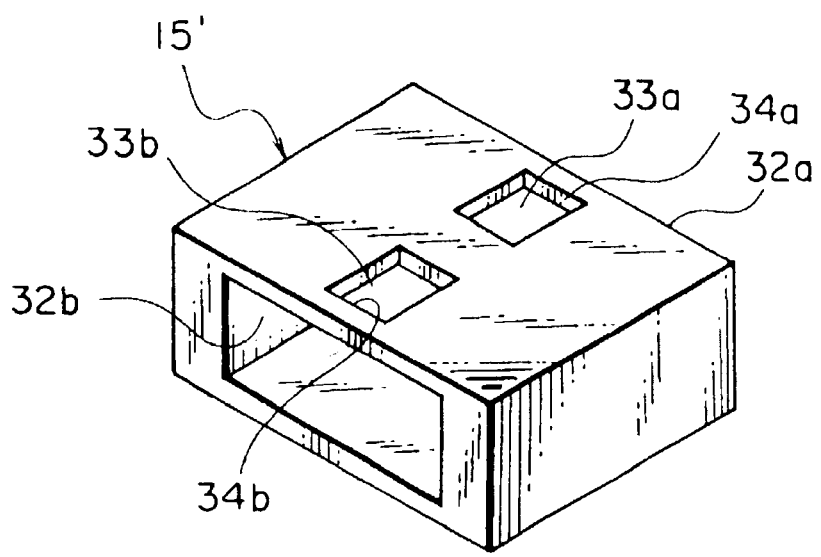
FIG. 4 is a perspective view of an adapter used in the optical connector shown in FIG. 1.

Referring also to FIG. 4, the adapter 15 will be described.

The adapter 15 is in the form of a square tubular member having first and second fitting openings 32a and 32b. In an upper surface of the adapter 15, first and second openings 33a and 33b are formed that are spaced apart from each other in the first direction A1. The first and second openings 33a and 33b define first and second engaging edges 34a and 34b, respectively. The first internal structure 14a is fitted in the first fitting opening 32a, while the second internal structure 14b is fitted in the second fitting opening 32b. As a result, the outer retaining portion 29a of the first engaging member 18a engages with the first engaging edge 34a in the first direction A1, while the outer retaining portion 29b of the second engaging member 18b engages with the second engaging edge 34b in the first direction A1.

In this manner, the first and second engaging members 18a and 18b both engage with the adapter 15 in the first direction A1 so that movement of the members 18a and 18b in separating directions from each other is locked. On the other hand, the first and second housings 17a and 17b are movable relative to the first and second engaging members 18a and 18b while being influenced by biasing forces of the first and second biasing members 19a and 19b, respectively.

Accordingly, the end surfaces of the core lines 12a and 12b of the first and second optical fibers 10a and 10b are suitably abutted with each other to establish optical connections therebetween.

By pushing inward the deformed portions 28a and 28b projecting above the upper surface of the adapter 15, the foregoing lock is released and the first and second optical connectors 11a and 11b can be detached from the adapter 15.

Figure 5:
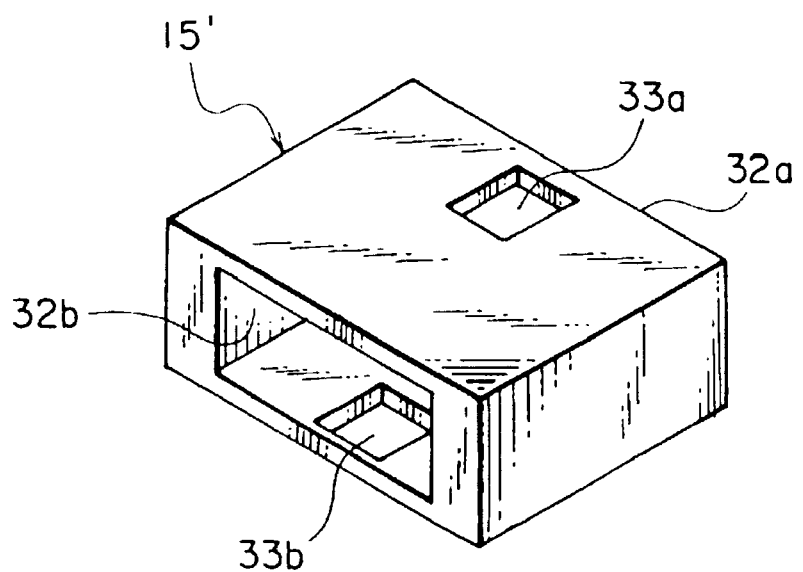
FIG. 5 is a perspective view showing a modification of the adapter shown in FIG. 4.

Referring to FIG. 5, a modification of the adapter will be described.

In a shown adapter 15', the first opening 33a is formed in an upper surface thereof, while the second opening 33b is formed in a lower surface thereof. Accordingly, the first engaging edge 34a is provided at the upper surface of the adapter 15', while the second engaging edge 34b is provided at the lower surface thereof. Even in this case, the first and second openings 33a and 33b are formed in positions that are spaced apart from each other in the first direction A1.

When using the adapter 15', the second internal structure 14b shown in FIG. 3 is fitted in the adapter 15' in a posture where the second internal structure 14b is rotated by 180° about an axis extending in the first direction A1. Then, the outer retaining portion 29b of the second engaging member 18b engages with the second engaging edge 34b. With respect to the outer retaining portion 29a of the first engaging member 18a, it is the same as that shown in FIG. 3.

According to this structure, since the first and second engaging edges 34a and 34b are separately provided on the upper and lower surfaces of the adapter 15', prevention of misfitting of the optical connector can be realized with an efficient space.

Figure 6:
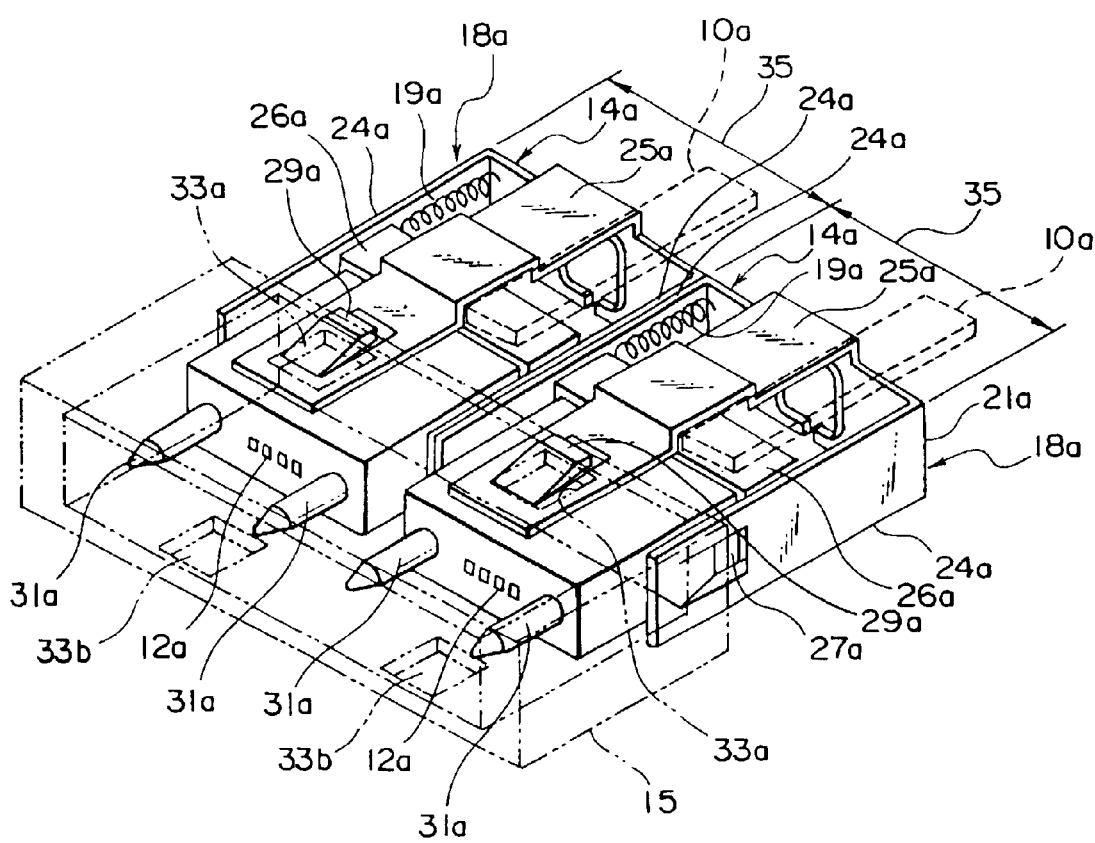
FIG. 6 is a perspective view showing an internal structure of an optical connector according to another preferred embodiment of the present invention.

Referring to FIG. 6, an optical connector according to another preferred embodiment of the present invention will be described. Portions like those in FIG. 3 are given the same reference symbols, thereby to omit explanation thereof.

The optical connector comprises a plurality of, specifically two, first internal structures 14a each explained using FIG. 3. Each of the first internal structures 14a is called herein an optical connector element. The optical connector elements 14a are fitted in a housing 15 collectively and in alignment with each other.

The housing 15 has two openings 33a in an upper surface thereof and two openings 33b in a lower surface thereof. Outer retaining portions 29a of the optical connector elements 14a engage with the openings 33a, respectively, so that the optical connector elements 14a are retained in the housing 15. Outer retaining portions of counterpart optical connector elements to be connected to the optical connector elements 14a engage with the other openings 33b, respectively, so that the counterpart optical connector elements are retained in the housing 15.

According to the configuration of FIG. 6, a multicore structure in which multiple core lines are used can be achieved only by reflecting the connector size in a direction of pitches 35. Further, since the openings for engagement with the outer retaining portions are formed separately on the upper and lower surfaces of the housing 15, a space can be utilized efficiently and assembling is facilitated.

What is claimed is:

1. An optical connector for connecting an optical fiber to a connection counterpart in a first direction, said optical connector comprising:

a housing for holding said optical fiber, said housing having a pair of main side surfaces confronting each other in a second direction perpendicular to said first direction, and a pair of auxiliary side surfaces confronting each other in a third direction perpendicular to said first and said second direction;

an engaging member slidable relative to said housing in said first direction; and a biasing member coupled to said housing and said engaging member for biasing said housing and said engaging member mutually opposite in said first direction, said engaging member comprising:

a pair of engaging strips each extending along a corresponding one of
said main side surfaces in said first direction and engaging with said corresponding one in a direction against said biasing member;

a spring strip extending along one of said auxiliary side surfaces in said first direction while being spaced apart therefrom, and being elastically deformable in said third direction; and an outer retaining member joined with said spring strip for retaining another member in said first direction.

2. The optical connector according to claim 1, wherein said housing has a pair of axial end surfaces opposite to each other in said first direction, said engaging member having a base portion opposite to one of said axial end surfaces, said base portion having a through hole for inserting said optical fiber therethrough and a cutout extending from said through hole to an outer edge of said base portion for allowing said optical fiber to pass therethrough.

3. The optical connector according to claim 2, wherein said engaging strips and said spring strip are joined with said base portion.

4. The optical connector according to claim 3, wherein said cutout is formed, seeing from said through hole, on an opposite side with respect to said spring strip, thereby to allow said engaging member to be attached to or detached from said housing while said optical fiber is retained by said housing.

5. The optical connector according to claim 2, wherein said biasing member is an elastic body disposed between said one of said axial end surfaces and said base portion.

6. The optical connector according to claim 5, wherein said elastic body is a compression coil spring.

7. The optical connector according to claim 2, wherein said optical fiber has an end surface exposed to the other of said axial end surfaces.

8. The optical connector according to claim 2, wherein the other of said axial end surfaces has a guide for guiding said connection counterpart.

9. The optical connector according to claim 1, wherein said housing has outward projecting portions at an intermediate position in said first direction, each of said engaging strips having an inner retaining portion retained by a corresponding one of said outward projecting portions.

10. The optical connector according to claim 9, wherein each of said engaging strips is elastically deformable in said second direction.

11. The optical connector according to claim 9, wherein said spring strip has a deformed portion forming a projection.

12. Then optical connector according to claim 1, wherein said outer retaining portion is in the form of a spring strip projecting from said elastically deformable spring strip in a direction away from said housing in said third direction.

13. The optical connector according to claim 1, further comprising an adapter as said another member fitted over said housing and said engaging member in said first direction, said adapter having an engaging edge for engaging with said outer retaining portion in said first direction.

14. Then optical connector according to claim 13, wherein said adapter has another engaging edge for engaging with said connection counterpart in said first direction.

15. An optical connector for connecting an optical fiber to a connection counterpart in a first direction, said optical connector comprising:

a plurality of aligned optical connector elements; and a first housing fitted over said optical connector elements collectively, each of sad optical connector elements comprising:

a second housing for retaining said optical fiber, said second housing having a pair of main side surfaces opposite to each other in a second direction perpendicular to said first direction, and a pair of auxiliary side surfaces opposite to each other in a third direction perpendicular to said first and said second directions;

an engaging member slidable relative to said second housing in said first direction; and a biasing member coupled to said second housing and said engaging member for biasing said second housing and said engaging member mutually opposite in said first direction, said engaging member comprising:

a pair of engaging strips each extending along a corresponding one of said main side surfaces in said first direction and engaging with said corresponding one of said main side surfaces in a direction against said biasing member;

a spring strip extending along one of said auxiliary side surfaces in said first while being spaced apart therefrom, and being elastically derformable in said third direction; and an outer retaining member joined with said spring strip for retaining another member in said first direction.

* * * * *